United States Patent
Zaruba et al.

(10) Patent No.: US 7,852,264 B2
(45) Date of Patent: Dec. 14, 2010

(54) SYSTEMS AND METHODS FOR FAST GNSS SIGNALS ACQUISITION

(75) Inventors: Radek Zaruba, Decin (CZ); Jan Kubalcik, Brno (CZ); Petr Burian, Brno (CZ)

(73) Assignee: Honeywell, SPOL. S.R.O. (CZ)

( * ) Notice: Subject to any disclaimer, the term of this patent is extended or adjusted under 35 U.S.C. 154(b) by 307 days.

(21) Appl. No.: 12/105,906

(22) Filed: Apr. 18, 2008

(65) Prior Publication Data
US 2009/0262017 A1 Oct. 22, 2009

(51) Int. Cl.
G01S 19/30 (2010.01)
(52) U.S. Cl. .................................. 342/357.69
(58) Field of Classification Search ............ 342/357.15, 342/357.12, 357.69, 357.63
See application file for complete search history.

(56) References Cited

U.S. PATENT DOCUMENTS

| 6,646,596 B2* | 11/2003 | Syrjarinne et al. ..... 342/357.15 |
| 6,922,546 B1 | 7/2005 | Da et al. |
| 7,064,709 B1* | 6/2006 | Weisenburger et al. . 342/357.12 |
| 7,495,610 B1* | 2/2009 | Norman et al. ........ 342/357.12 |
| 7,605,757 B1* | 10/2009 | Gribble et al. ............. 342/385 |
| 2002/0005802 A1* | 1/2002 | Bryant et al. .......... 342/357.01 |
| 2003/0201933 A1* | 10/2003 | Cohen et al. ........... 342/357.12 |
| 2006/0058027 A1 | 3/2006 | Fang et al. |
| 2006/0232471 A1* | 10/2006 | Coumou .................... 342/450 |
| 2006/0285581 A1 | 12/2006 | Mattos |
| 2007/0040741 A1* | 2/2007 | Loomis ................. 342/357.15 |

OTHER PUBLICATIONS

European Patent Office, "European Search Report", May 10, 2010, Published in: EP.
Heinrichs et al. , "Hybrid Galileo/UMTS Receiver Prototype for Mass-Market Applications", "ENC-GNSS Proceedings: The European Navigation Conference", Jul. 19, 2005.
Maurer et al. , "On The Design of a Configurable UMTS/NAVSAT Transceiver", "Ist Mobile & Wireless Communications Summit", Jun. 20, 2005.

* cited by examiner

Primary Examiner—Thomas H Tarcza
Assistant Examiner—Fred H Mull
(74) Attorney, Agent, or Firm—Fogg & Powers LLC

(57) ABSTRACT

Systems and methods for acquiring global navigation satellite system (GNSS) signals. An incoming signal is multiplied with a time shifted spreading code replica and converted to zero (or very low) nominal frequency. The converted signal is filtered and downsampled by a large scale. A signal power metric and frequency offset are then determined. This is performed over multiple slices. Fast acquisition is achieved by parallel concatenation of numerous slices.

11 Claims, 5 Drawing Sheets

SYSTEMS AND METHODS FOR FAST GNSS SIGNALS ACQUISITION

BACKGROUND OF THE INVENTION

In global navigation satellite systems (GNSS) (e.g. GPS and GALILEO), signals are broadcast from satellites using code division multiple access (CDMA) where a signal from each satellite is identified by a unique pseudorandom code (spreading code). At the receiver the overlapping signals from all satellites are processed to determine receiver position. The processing involves first searching for the presence of a signal and estimation of its frequency offset and code offset relative to a reference clock (acquisition) and then refining the estimates, demodulating the received data and determining the position (tracking) Both acquisition and tracking involve correlating received signals with a locally generated version of the pseudo random codes over an integration period.

In spread spectrum systems, acquisition is difficult because it typically requires a search over two dimensions (frequency and time). It is further complicated in situations where signal to noise ratio is severely degraded,. e.g. due to limited sky visibility (indoors navigation) or due to presence of strong interferences. In some cases the equivalent degradation of desired signal is up to 20dB.

The search grid density in the two dimensional search process is given by spreading code length and integration period. Resolution in the time domain is typically 0.5 chip period of the spreading sequence and in frequency domain 0.5 pre-correlation bandwidth, where pre-correlation bandwidth is inversely proportional to integration period. For example, GPS CIA signal uses 1 ms long spreading codes generated at 1.023 MHz (1023 chips per period). With integration time of 1 ms (i.e. 1 kHz pre-correlation bandwidth) and ±5 kHz frequency uncertainty the typical number of bins is 20 in frequency domain and 2046 in time domain, i.e. more than 40,000 cells in total. For outdoors, evaluation of each cell takes one millisecond and for indoors, each cell would take 100 milliseconds because of the weaker signal strength. This results in a search time of 40 seconds for outdoors or 4000 seconds for indoors, on a single correlator.

This problem traditionally is addressed by processing in the frequency domain, often based on Fast Fourier Transform, or by using parallelism in the time domain employing (often massive) bank of correlators. Such approaches, however, pose extra requirements on the hardware in terms of speed and/or hardware complexity which results in higher cost and power consumption.

Detection of weak signals is limited by factors like reference clock stability and system dynamic properties (maximum speed, acceleration). In optimal approach the weaker the signal that needs to be detected, the longer the coherent integration time should be used. On the other hand, as the coherent integration time increases, the pre-detection bandwidth decreases. Therefore, a finer search resolution over frequency is required and the clock stability requirements are more stringent.

Some sub-optimal methods can be used to detect weak signals while keeping the requirements on search resolution and clocks stability reasonably low. The classical approach is to use limited coherent integration time and noncoherently sum the results of many subsequent coherent integrations. Here the term "noncoherent sum" typically stands for sum of amplitudes. This invention describes alternative suboptimal method that can bring benefits in terms of acquisition times and hardware resources.

SUMMARY OF THE INVENTION

The present invention provides systems and methods for acquiring global navigation satellite system (GNSS) signals.

An incoming signal is multiplied with a time shifted spreading code replica and converted to zero (or very low) nominal frequency. Frequency conversion and code multiplication can be done in arbitrary order. The converted signal is filtered and downsampled by a large scale. A signal power metric representing a level of alignment of local code replica with incoming signal and frequency offset are then determined. This is performed over multiple slices where each slice provides power metric and frequency estimate for one code offset. Fast acquisition is achieved by parallel concatenation of numerous slices.

An acquisition and tracking control unit uses the power metric outputs from multiple acquisition slices to determine optimum alignment of local code replica with the incoming signal. When peak in power metric is determined at output of particular acquisition slice, related code and frequency offsets are captured and fed to tracking units as initial conditions.

An Acquisition and tracking control unit uses the power metric outputs from multiple acquisition slices to determine optimum alignment of local code replica with the incoming signal. When peak in power metric is determined at output of particular acquisition slice, related code and frequency offsets are captured and fed to tracking units as initial conditions.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
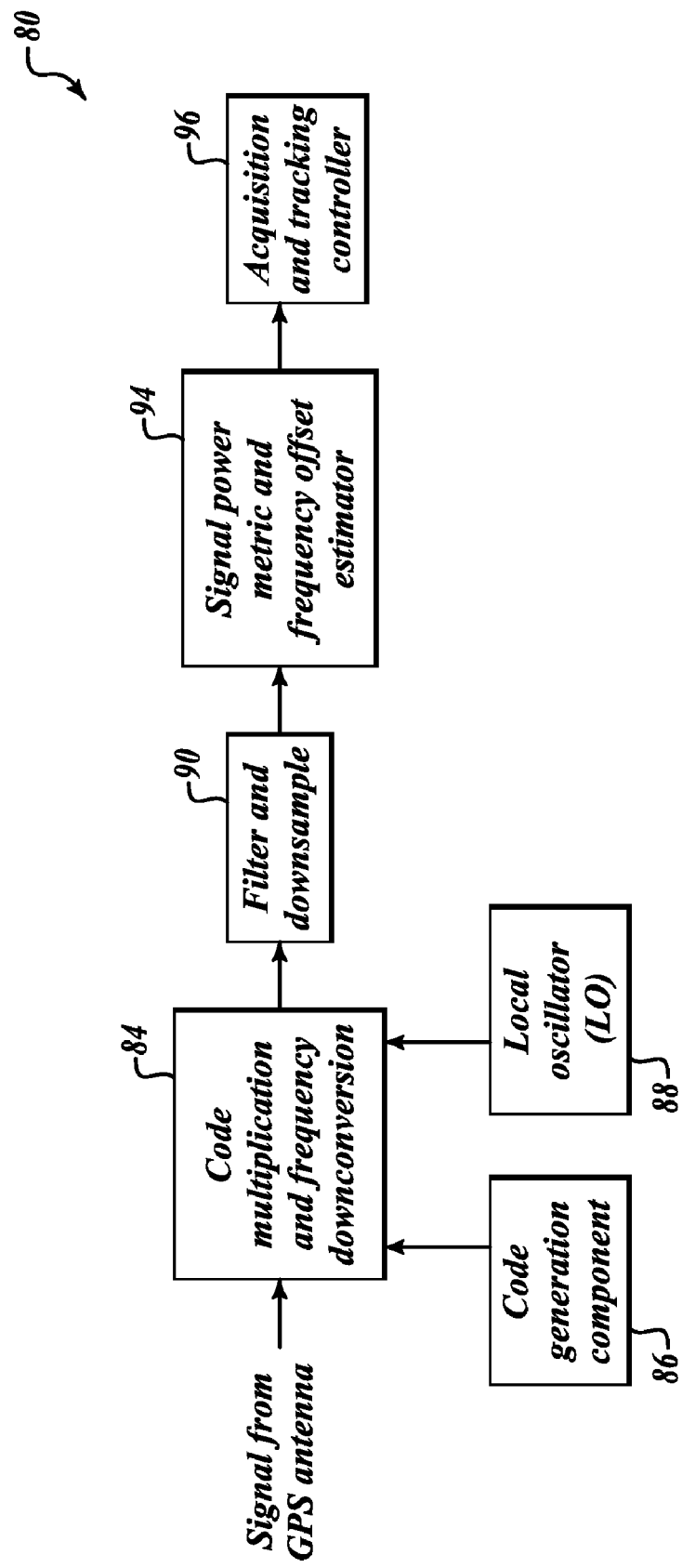
FIG. 1 is a block diagram of one embodiment of a system that acquires global navigation satellite system (GNSS) signals.

FIG. 1 illustrates an example system 80 that efficiently acquires signals received from a global navigation satellite system (GNSS) in accordance with an embodiment of the present invention. The system 80 includes a code multiplication and frequency downconversion unit 84, a code generation component 86, a local oscillator (LO) 88, a filter and downsample component 90 and a signal power metric and frequency offset estimator 94.

The code multiplication and frequency downconversion unit 84 receives signals from the GNSS via an antenna and front end receiver components (not shown) and generates a plurality of downconverted intermediate frequency (IF) signals representing varied relative time shifts between local code replica and incoming signal based on spreading codes received from the code generation component 86 and only a single frequency signal generated by the LO 88.

The filter and downsample component 90 further reduces (decimates) the sample frequency ($f_s$) of the signals outputted from the code multiplication and frequency downconversion unit 84. Filtering also occurs at the filter and downsample component 90 as will be described later. The signal power metric and frequency offset estimator 94 receives the output of the filter and downsample component 90 and generates both a signal power metric value and estimate of the frequency offset of that received signal. The estimator 94 performs signal power metric and frequency offset estimation based on each of the time-varied spreading codes. The output of the estimator 94 is sent to an acquisition and tracking controller 96 that uses the output of the estimator 94 for detection of signal presence, estimation of its parameters and initialization of tracking.

The functions performed by the downconversion unit 84, the code generation component 86, the LO 88 and the filter and downsample component 90 are performed by the prior art except that the LO 88 in the prior art produces a plurality of frequencies stepped by some Δf through a range of frequencies based on a predefined estimation of possible frequencies of the GNSS signals that may be received. Also, in the present invention, the filter and downsample component 90 is implemented with hardware components not found in the prior art, although the function performed is known by the prior art.

Figure 2:
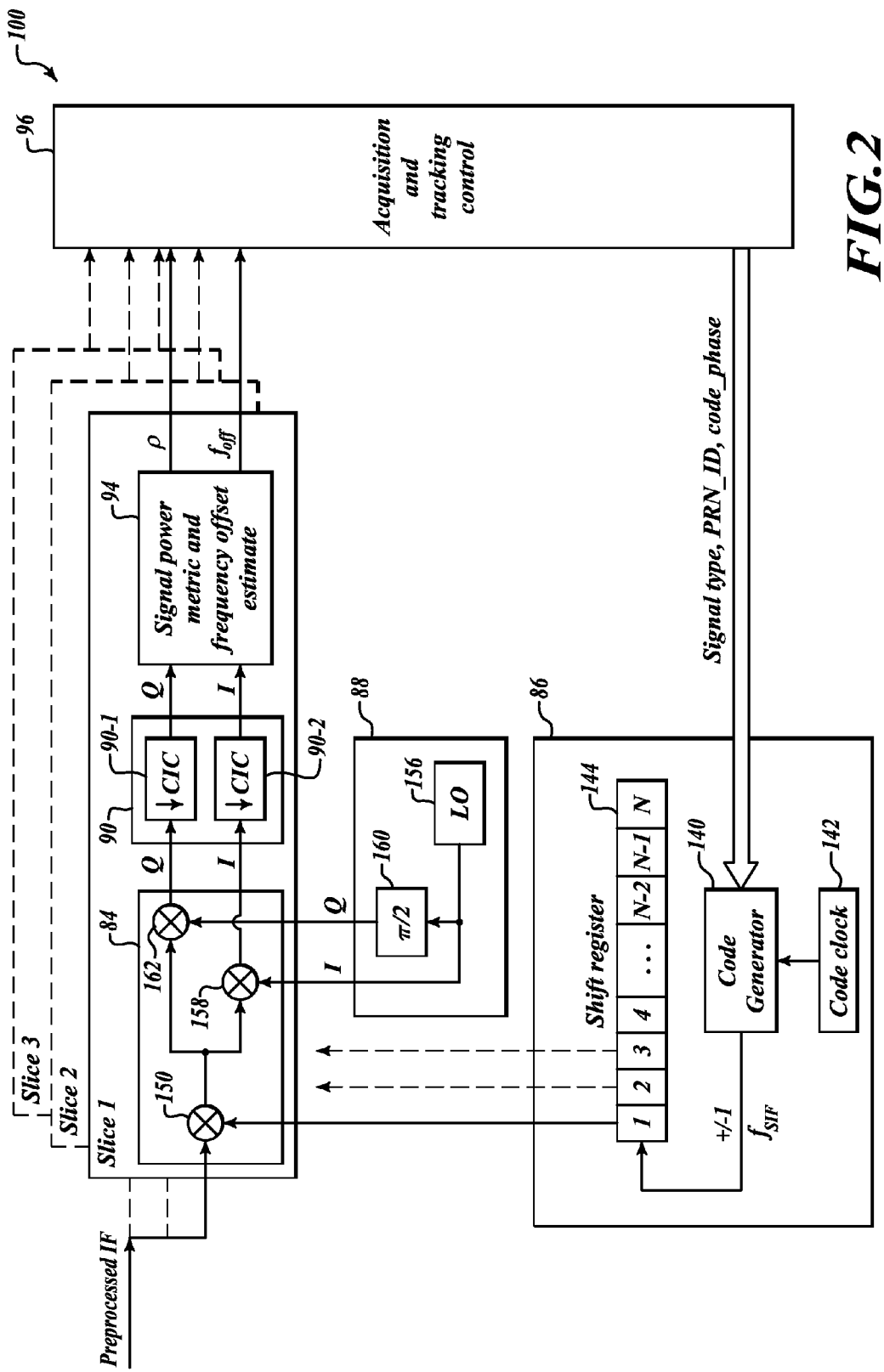
FIG. 2 is a block diagram of an alternative system that acquires global navigation satellite system (GNSS) signals.

FIG. 2 illustrates a system 100 that is a more detailed example of the system 80 as shown in FIG. 1. The example system 100 includes a plurality of slices of hardware components that receive a preprocessed IF signal. In this embodiment, a single code generation component 86 can be used to supply time delay spreading codes across each of the slices. The code generation component 86 includes a code generator 140, a code clock 142, and a shift register 144. The code generator 140 generates spreading codes based on input information from the acquisition and tracking controller 96 and a clock signal from the code clock 142. The output of the code generator 140 is sent to the shift register 144, which performs a time delay delivery of the spreading codes to the slices. Alternatively only a single code can be outputted from code generator 86 and the shift register 144 can be placed at the preprocessed IF input to deliver time delayed samples of incoming signal to multiple slices. Within each of the slices, the code multiplication and frequency downconversion unit 84 receives the spreading code at a first multiplier 150 that multiplies it with the preprocessed IF signal. The LO 88 includes a local oscillator 156 and a phase delay component 160. The local oscillator 88 produces I and Q signals that are sent to multipliers 158 and 162 in the downconversion unit 84 in order to perform frequency downconversion of the signal outputted from the multiplier 150.

The I and Q signals from the downconversion unit 84 are fed to the cascaded integrator-comb (CIC) filters 90-1 and 90-2 of the filter and downsample component 90. The CIC filters 90-1 and 90-2 perform further downsampling and filtering. Other hardware devices may be used in place of the CIC filters 90-1 and 90-2.

THE PRESENT INVENTION

One of the major advantages of described acquisition method is the possibility of using a fixed LO 156 for relatively slow spreading codes (GPS C/A and BOC (1,1) planned for GPS and Galileo LI). The easiest and most HW economical implementation is with LO running at ¼ of sampling frequency $f_s$. However it must be noted that for fast spreading codes (GPS military P-code and codes planned for GPS and Galileo L5) the integration time is limited by received code drift caused by Doppler and local clock error. Thus for sensitive acquisition (long integration times) at least code clock and optionally local oscillator used to generate local replica must be adjustable and size of frequency bins evaluated by herein presented method must be limited by generation of replica at an appropriate number of frequency offsets. This way the method becomes similar to classical approach, however it can still be beneficial in some implementations, e.g. due to possible frequency estimate accuracy improvement. Also the number of evaluated frequency bins can still be significantly lower than with classical methods. Also, it can be expected that in most applications independent acquisition of fast codes (L5) will not be necessary as it can be aided by results obtained from LI acquisition.

Code multiplication and frequency downconversion can be done in any order. Also, the input signal can be downconverted to zero IF externally by an analog quadrature mixer, i.e., conversion to zero IF can be done as part of the receiver front end.

Figure 3:
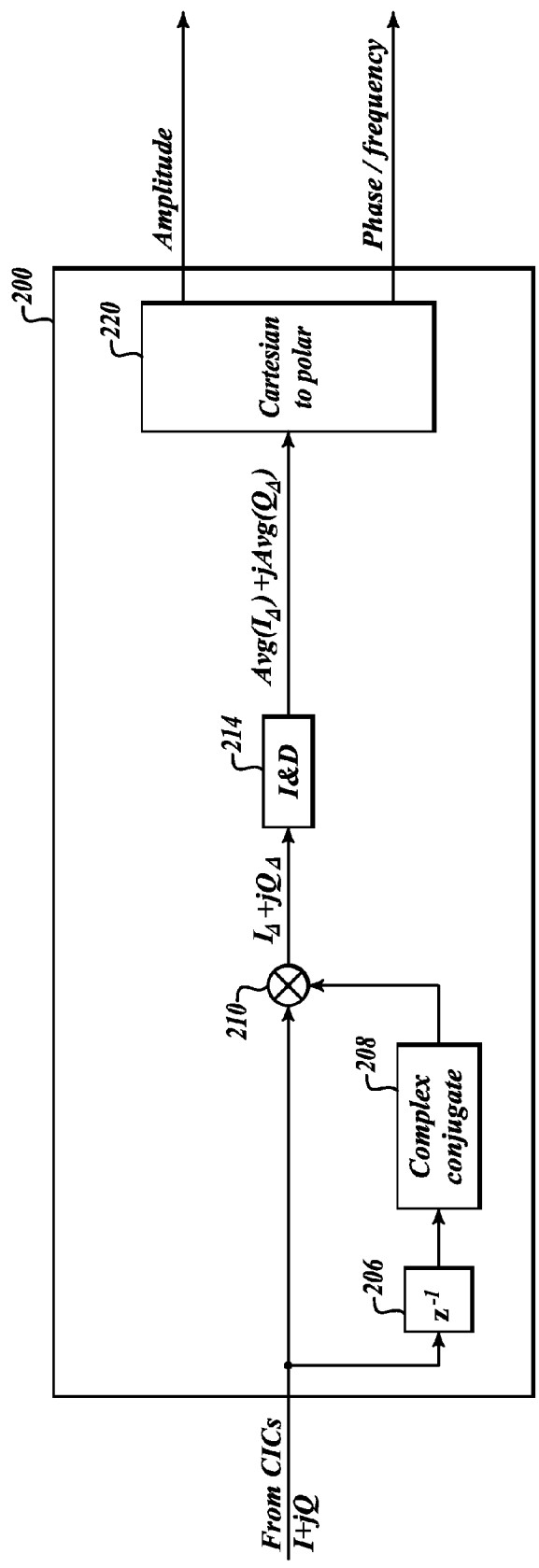
FIG. 3 is a schematic diagram of one embodiment of a signal power metric and frequency offset estimator.
Figure 4:
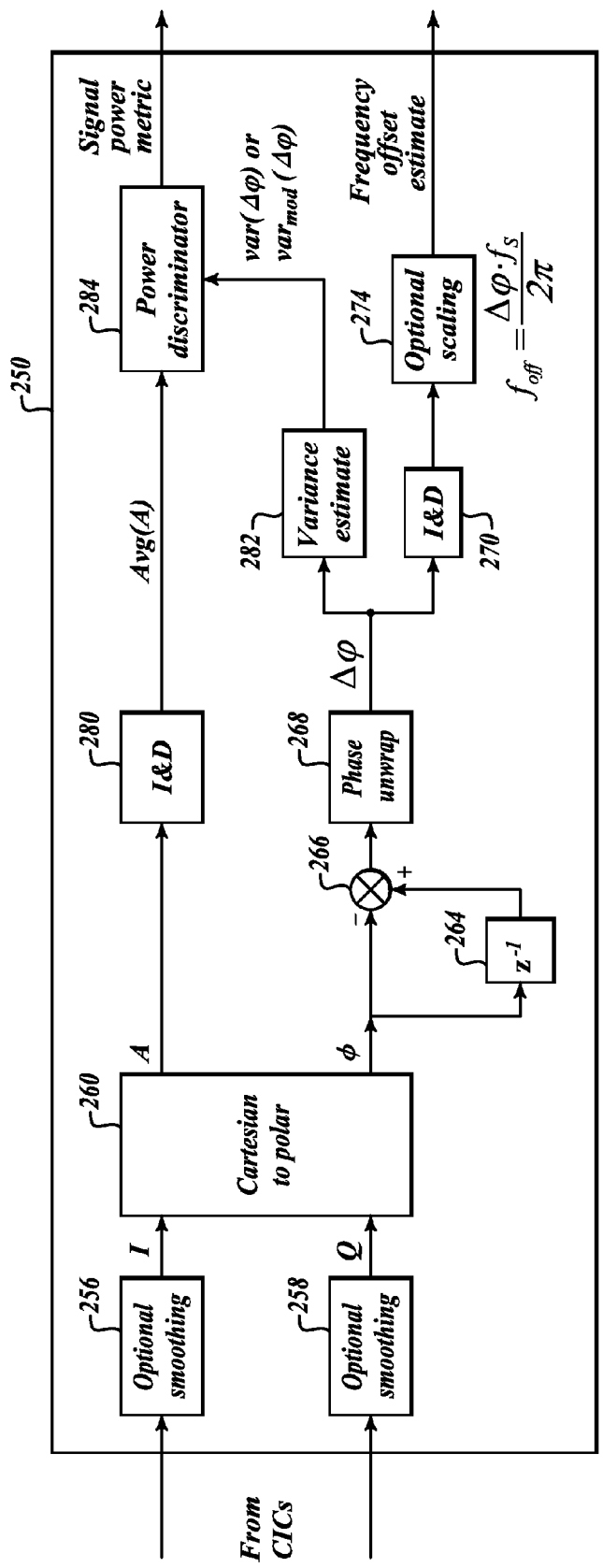
FIG. 4 is a schematic diagram of an alternative embodiment of a signal power metric and frequency offset estimator.

FIGS. 3 and 4 illustrate two different embodiments for the signal power metric and frequency offset estimator 94. As shown in FIG. 3, an estimator 200 receives a combination of the in-phase I and quadrature Q signals from the CICs 90-1 and 90-2 (FIG. 2). The received combined signal is applied to a multiplier 210 and is multiplied with the same signal that is delayed by a delay device 206 and acted upon by a complex conjugate component 208, which operations are known to those having ordinary skill in the art.

$I_\Delta$ and $Q_\Delta$ are outputted from the multiplier 210 and sent to an averaging component 214. An example averaging component is an integration and dump (I&D) device. The output $(Avg(I_\Delta)+jAvg(Q_\Delta))$ of the component 214 is then supplied to a device 220 that performs a Cartesian to polar conversion to produce an amplitude component (signal power metric) and a phase component (frequency offset estimate). An example algorithm that performs Cartesian to polar conversion is the coordinate rotation digital computer (CORDIC) algorithm. Other conversion algorithms may be used. The amplitude and phase components are then sent to the acquisition and tracking controller 96. The Cartesian to polar conversion device 220 generates the signal power metric (amplitude) in accordance with the following embodiment:

$$\text{input signal: } s_k = I_k + jQ_k = A_k e^{j\varphi_k}$$

$$\text{after multiplication } s_k s_{k-1}^* = A_k A_{k-1} e^{j(\varphi_k - \varphi_k)} = I_{k,\Delta} + jQ_{k,\Delta}$$

$$\text{power metric: } M_{PWR} = \sqrt{[Avg(I_{k,\Delta})]^2 + [Avg(Q_{k,\Delta})]^2} \rightarrow A$$

where j is imaginary unit and $s_k$ is complex number representing I and Q components coming from the CIC filters 90-1 and 90-2 at time $k/f_S$ ($f_S$ is sample frequency at output of CIC filters).

A is amplitude of harmonic signal (if present) and 0 if no signal is present.

Depending on particular HW implementation usage of square of amplitude ($A^2$) can be also advantageous.

The Cartesian to polar coordinate conversion device 220 generates phase as follows:

Frequency is estimated directly from angle of averaged $I_\Delta$ and $Q_\Delta$ as:

$$f_{\text{offset}} = \frac{\text{angle } (Avg(I_\Delta) + j \cdot Avg(Q_\Delta)) f_s}{2\pi}$$

where $f_s$ is sampling frequency (at input of multiplier 210).

To avoid biased estimates, additive noise at the input of the multiplier 210 needs to be white, i.e. consecutive samples need to be independent of each other. This condition is well satisfied if CIC filter with single delay in comb section is used and no additional smoothing is applied.

FIG. 4 illustrates an alternate embodiment for the signal power metric and frequency offset estimator 94 as shown in FIGS. 1 and 2. An example estimator 250 receives the I and Q signals from the CICs 90-1, 90-2 into optional filtering components 256 and 258. One example is moving average filtering (sum of N consecutive samples optionally divided by N) but generally any other digital filter can be applied. To achieve maximum sensitivity, as much additive noise as possible needs to be filtered out. Depending on particular implementation phase modulo arithmetic can require sampling frequency significantly higher than $2f_{IFMAX}$ (Nyquist sampling theorem). In this case, additional filtering (smoothing) is applied. This can be achieved either by more than one sample delay in CIC's comb section or by additional filtering in component 256. A Cartesian to polar conversion device 260 generates amplitude and phase values from the received I and Q signals. Cartesian polar conversion can be accomplished using e.g. CORDIC algorithms. The outputted phase value ($\phi$) is subtracted at a combiner 266 from phase delayed by a delay device 264. Next, the output of the combiner 266 is sent through a phase unwrap component 268 for performing smoothing of the phase value to produce a delta phase ($\Delta\phi$). The $\Delta\phi$ outputted by the phase unwrap component 268 is sent to an I&D (averaging) component 270. The averaged output Avg ($\Delta\phi$) is then sent to an optional scaling device 274 in order to generate the frequency offset estimate according to the following equation:

$$f_{offset} = \frac{Avg(\Delta\varphi) \cdot f_s}{2\pi}$$

The $\Delta\phi$ is also sent to a variance estimator 282 that produces a phase increase variance value (var($\Delta\phi$)) or a modified second moment of phase increase value ($var_{mod}(\Delta\phi)$) depending upon a predefined option. A power discriminator 284 receives the averaged amplitude value (Avg(A)) from an I&D device 280 and one of the outputs of the variance estimator 282 to determine signal power metric value. See the following power discriminator options:

$$M_{PWR} = \frac{Avg(A)}{var(\Delta\varphi)} \quad \text{Option 1}$$

$$M_{PWR} = \frac{Avg(A)}{var_{mod}(\Delta\varphi)} \quad \text{Option 2}$$

where $var_{mod}(x)=Avg(|x-Avg(x)|)$

Option 3 (not depicted): For strong signals only one of the discriminator inputs is used.

Option 4 (not depicted): Any of these metrics can be used in combination with that shown in FIG. 3 to support weak signals detection.

The present invention can exploit data and pilot channels that are going to be used in Galileo and modernized GPS systems. Each data and pilot channel use different spreading codes but are modulated on the same carrier. Data and pilot channels can thus be combined at various levels. Out of all the options combining data and pilot metrics at input of integrate and dump (I&D) blocks depicted in FIGS. 3 and 4 is believed to be most reasonable:

FIG. 3:

$$I_\Delta = I_{\Delta,Pilot} + I_{\Delta,Data}, \quad Q_\Delta = Q_{\Delta,Pilot} + Q_{\Delta,Data}$$

FIG. 4:

$$\Delta\phi = \Delta\phi_{Data} + \Delta\phi_{Pilot}, \quad A = A_{Pilot} + A_{Data}$$

Figure 5:
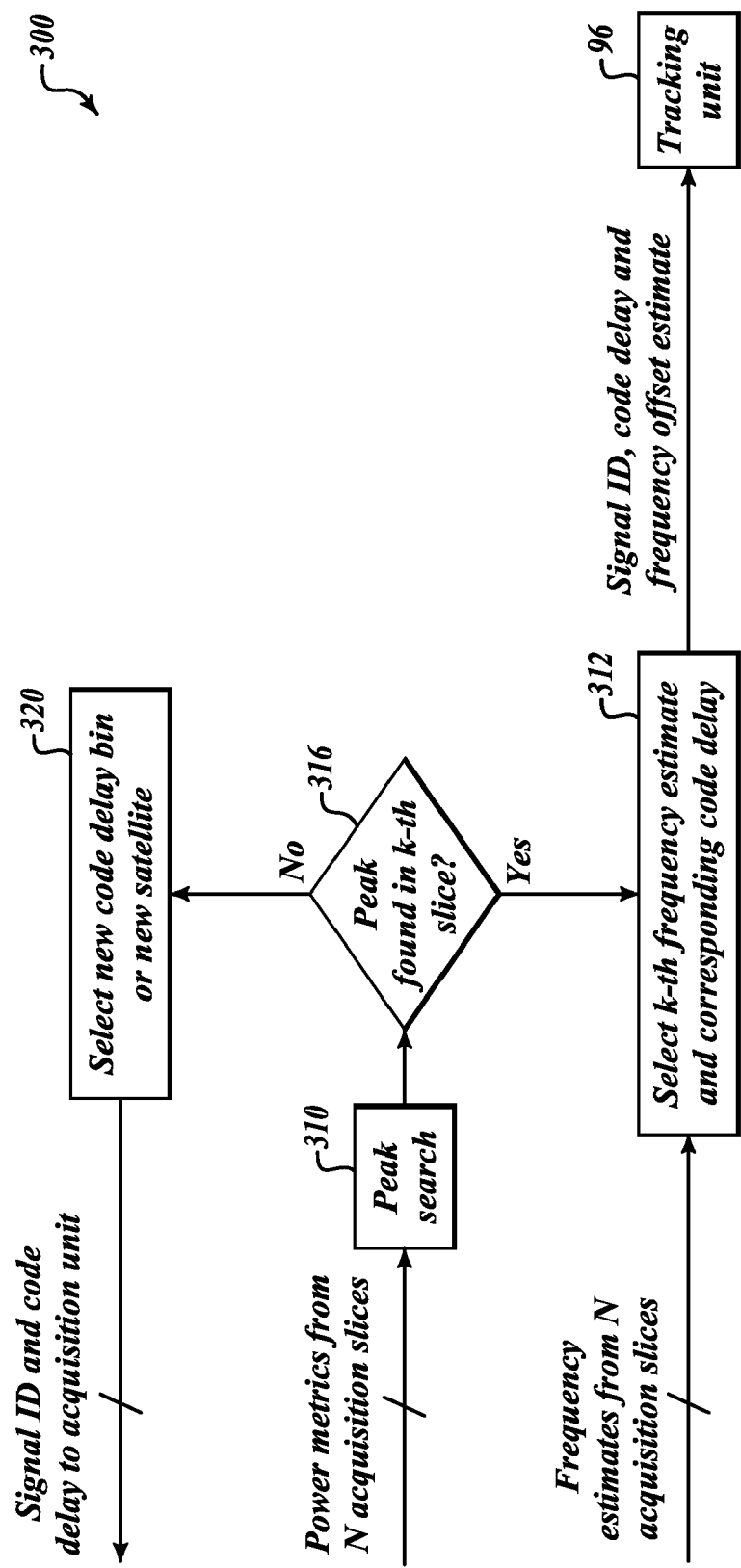
FIG. 5 is a flowchart of one embodiment of a method of signal acquisition and tracking

FIG. 5 illustrates an example process 300 performed by the acquisition and tracking controller 96. First, at a block 310, the amplitudes/power metrics from all the slices are compared to a predetermined threshold and eventually to each other to determine potential signal presence. The concrete implementation of block 310 may be varied, however methods similar to those used in standard acquisition methods for correlation peak search can be used. If the peak is positively detected at the output of particular slice (decision block 316), the controller proceeds to standard acquisition refinement (fine carrier and code synchronization in phase locked loops and delay locked loops, bit synchronization and frame synchronization—block 312) and tracking performed in tracking units 96. Code offset and rough frequency offset estimates corresponding to slice where the peak was detected are used as initial conditions for this subsequent process. If the peak is not detected at the output of particular slice (decision block 316), the controller selects a new code delay bin or a new satellite (block 320).

The present invention describes processing after analog to digital conversion, i.e. in digital HW like a Field Programmable Gate Array (FPGA) or Application Specific Integrated Circuit (ASIC).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A global navigation satellite system (GNSS) receiver for acquiring at least one signal broadcasted by a GNSS satellite, said system comprising:
a first component configured to receive signals, wherein the received signals include at least one signal broadcasted by a GNSS satellite;
a second component configured to multiply the received signal with a local code replica at a plurality of relative time offsets, downconvert the signal using a single local oscillator, filter the downconverted signal and decimate the sample frequency of the filtered signal;
a third component configured to determine a signal power metric and estimate frequency offset for each of the filtered and downconverted signals; and
a fourth component configured to detect presence of the at least one signal broadcasted from GNSS satellite and to acquire the initial estimate of code and frequency offset of the detected signal based on the determined signal power metrics and estimated frequency offsets;
wherein the filtered and downconverted signals include in-phase and quadrature signals and the third component comprises a Cartesian to polar conversion component configured to generate at least one of amplitude or a square of amplitude and phase signals based on the in-phase and quadrature signals.

2. The receiver of claim 1, wherein the second component comprises at least one cascaded integrator-comb (CIC) filter.

3. The receiver of claim 1, wherein the third component is configured to represent incoming in-phase and quadrature signals as real and imaginary parts of a complex sample and prior to conversion to polar coordinates performs complex multiplication of current and delayed input complex samples, wherein one of the current and delayed complex samples is complex conjugated, then the third component averages the real and imaginary components obtained from said complex multiplication over a selected amount of samples, and calculates the frequency offset with a phase output of the Cartesian to polar conversion component.

4. The receiver of claim 1, wherein the third component averages the amplitude and determines at least one of a phase increase variance or a modified second moment of phase increase, then determines the signal frequency estimate based on averaged phase increase and the signal power metric based on the averaged amplitude and at least one of the phase increase variance or the modified second moment of phase increase.

5. A global navigation satellite system (GNSS) receiving method for acquiring at least one signal broadcasted by a GNSS satellite, said method comprising:
receiving signals, wherein the received signals include at least one signal broadcasted by a GNSS satellite;
multiplying the received signal with a local code replica at a plurality of relative time offsets;
downconverting of the received signal using a single local oscillator;
filtering the downconverted signal;
decimating a sample frequency of the filtered signal;
determining a signal power metric and a frequency offset for each of the decimated signals; and
detecting presence of signal broadcasted from a GNSS satellite and acquiring the initial estimate of code and frequency offset of the signal broadcasted based on the determined signal power metrics and estimated frequency offsets;
wherein the filtered and downconverted signals include in-phase and quadrature signals and wherein determining comprises converting the in-phase and quadrature signals from Cartesian to polar, thereby generating at least one of amplitude, square of amplitude, and phase signals.

6. The method of claim 5, wherein the second component comprises at least one cascaded integrator-comb (CIC) filter.

7. The method of claim 5, wherein determining comprises representing the in-phase and quadrature components as real and imaginary parts of complex samples and prior to conversion to polar coordinates performing complex multiplication of current and delayed complex samples, wherein one of the current and delayed complex samples is complex conjugated, then averaging real and imaginary components obtained from said complex multiplication over a selected amount of samples, then calculating the frequency offset based on the phase of the averaged complex samples.

8. The method of claim 5, wherein determining comprises averaging the amplitude and determining at least one of a phase increase variance or a modified second moment of phase increase, then determining the signal power metric based on the averaged amplitude and at least one of the phase increase variance or the modified second moment of phase increase.

9. A global navigation satellite system (GNSS) receiver for acquiring at least one signal broadcasted by a GNSS satellite, said system comprising:
a first component configured to receive signals, wherein the received signals include at least one signal broadcasted by a GNSS satellite;
a second component configured to multiply a received signal with a local code replica at a plurality of relative time offsets, downconvert the multiplied signal using a single local oscillator, filter the downconverted signal and decimate the sample frequency of the filtered signal;
a third component configured to represent the filtered and downconverted signals as real and imaginary components of a complex sample, perform complex multiplication of current and delayed complex samples, wherein one of the current and delayed complex samples is complex conjugated, average the real and imaginary components over a selected amount of complex samples, convert the averaged samples from Cartesian to polar coordinates, and determine a signal power metric and estimate frequency offset for each of the filtered and downconverted signals based on the averaged real and imaginary components; and
a fourth component configured to detect presence of the at least one signal broadcasted from the GNSS satellite and to acquire an initial estimate of code and frequency offset of the detected signal based on the determined signal power metrics and estimated frequency offsets.

10. The receiver of claim 9, wherein the filtered and downconverted signals include in-phase and quadrature signals and the third component comprises a Cartesian to polar conversion component configured to generate at least one of amplitude or a square of amplitude and phase signals based on the in-phase and quadrature signals.

11. The receiver of claim 9, wherein the third component averages the amplitude and determines at least one of a phase increase variance or a modified second moment of phase increase, then determines the signal frequency offset estimate based on the averaged phase increase and the signal power metric based on the averaged amplitude and at least one of the phase increase variance or the modified second moment of phase increase.

* * * * *